United States Patent
Bourazak et al.

(10) Patent No.: US 7,306,721 B1
(45) Date of Patent: Dec. 11, 2007

(54) FLUID TREATMENT APPARATUS

(75) Inventors: Jamel Bourazak, Peoria, IL (US);
Larry Coleman, Peoria, IL (US)

(73) Assignee: Elm Technologies, L.L.C., Peoria, IL (US)

( * ) Notice: Subject to any disclaimer, the term of this patent is extended or adjusted under 35 U.S.C. 154(b) by 322 days.

(21) Appl. No.: 10/987,101

(22) Filed: Nov. 12, 2004

Related U.S. Application Data

(62) Division of application No. 10/321,189, filed on Dec. 17, 2002, now Pat. No. 6,875,347.

(51) Int. Cl.
*C02F 1/48* (2006.01)

(52) U.S. Cl. .................. 210/205; 210/243; 204/280; 204/672

(58) Field of Classification Search .......... 210/198.1, 210/205, 243, 748; 422/186.04; 205/742; 204/554, 573, 660, 280, 290.01, 290.12, 204/292, 293, 672, 673
See application file for complete search history.

(56) References Cited

U.S. PATENT DOCUMENTS

| | | | | |
|---|---|---|---|---|
| 3,926,771 A | * | 12/1975 | Lieb et al. ................... 204/268 |
| 3,975,247 A | * | 8/1976 | Stralser ....................... 205/701 |
| 4,006,067 A | * | 2/1977 | Gussack ...................... 205/746 |
| 4,654,071 A | * | 3/1987 | Muller ........................ 205/688 |
| 5,372,690 A | * | 12/1994 | Gardner-Clayson et al. ..... 204/255 |
| 5,587,057 A | * | 12/1996 | Metzler et al. ........... 204/228.6 |
| 5,779,912 A | * | 7/1998 | Gonzalez-Martin et al. 210/748 |
| 6,141,905 A | * | 11/2000 | Rozental et al. ......... 47/58.1 R |
| 6,325,944 B1 | * | 12/2001 | DeSanto ..................... 210/748 |
| 6,328,875 B1 | * | 12/2001 | Zappi et al. ................. 205/500 |
| 6,875,347 B2 | * | 4/2005 | Bourazak et al. ......... 210/198.1 |
| 2002/0070178 A1 | * | 6/2002 | Steffens et al. ............. 210/748 |
| 2003/0155310 A1 | * | 8/2003 | Nilsen et al. ............... 210/748 |

FOREIGN PATENT DOCUMENTS

| | | | |
|---|---|---|---|
| JP | 62-102891 A | * | 5/1987 |
| JP | 10-118390 A | * | 5/1998 |

* cited by examiner

*Primary Examiner*—Frank M. Lawrence
(74) *Attorney, Agent, or Firm*—Golden's M & I; James B. Golden

(57) ABSTRACT

A fluid treatment system for reducing odor, bacteria, and biological oxygen demand from a fluid having at least one tube, a control box, and a pump. The at least one tube has a plurality of conductors in electrical communication with the control box. The control box controls the level of electrical communication to the plurality of conductors and the flow rate of the pump. The principle use is for biomass material derived from animals, however other fluids will benefit from this invention. For example, fluids derived from plants and humans will benefit from this application.

14 Claims, 6 Drawing Sheets

FLUID TREATMENT APPARATUS

CROSS REFERENCE

This application is a divisional and claims the benefit of the regular U.S. patent application Ser. No. 10/321,189 filed Dec. 17, 2002 now U.S. Pat. No. 6,875,347.

TECHNICAL FIELD

This invention relates generally to a fluid treatment system and more particularly to a fluid treatment system having at least one tube adapted to conduct electrical current through the fluid.

BACKGROUND ART

Fluid treatment systems are constantly being modified to provide a more environmentally friendly byproduct. Providing an environmentally friendly byproduct often subjects the fluid treatment system to increased wear, complexity, and maintenance. It is for that reason that emphasis has been placed over the past several years on new and economical designs for manufacturing a fluid treatment system capable of withstanding wear, complexity, and maintenance.

Various fluid treatment systems have been developed in an attempt to improve the byproduct. For example, U.S. Pat. No. 6,141,905 to Rozental discloses a fluid treatment system that supposedly provides a single reactor with a number of electrode configurations capable of providing an environmentally friendly byproduct. However, the reactor disclosed requires close proximity of electrodes in the stream of the fluid treatment system. Due to the level of electric current required for reduction of constituents leads to an increase in the temperature of the waste stream. Due to the increased temperature experienced during operation, the electrodes are subjected to increase wear and maintenance.

Another problem inherent with the fluid treatment systems is premature corrosion of electrodes. It has been found that applying electric current, during operation, provides a reaction between the waste stream and electrodes causing wear to the electrodes. The wear varies widely between electrodes causing control of the fluid treatment system to be reduced. To have the fluid treatment system operates efficiently and satisfactory from the point of view of having an environmentally friendly byproduct, it is desirable to maintain a degree of uniformity and consistency between electrodes.

Yet another problem, control of the fluid treatment system is crucial for efficient operation. Operation of the fluid treatment system changes over time due to wear of components. It is desirable to maintain consistent operation between electrodes, especially through the life of the system.

Yet another problem, flexibility of the fluid treatment system is becoming increasingly important. Having a fluid treatment system with a predetermined capacity limits owners to specific operating criteria. Because of the desire to adjust capacity of fluid treatment systems, it has made it desirable to add additional reaction tubes or remove unneeded reaction tubes. That is, the fluid treatment system is optimized as the demand changes.

The present invention is directed to overcoming one or more of the problems set forth above.

DISCLOSURE OF THE INVENTION

In one aspect of the present invention, a fluid treatment system includes a power source. At least one tube has an inlet and an outlet. The tube is in electrical communication with the power source. A fluid has a first magnitude of odor passing through the inlet. The fluid has a conductive characteristic enabling electrical current to pass through the fluid when passed through the tube. The fluid has a second magnitude of odor passing through the outlet and the second magnitude of odor is less in magnitude than the first magnitude of odor.

In another aspect of the present invention, a control system is adapted for use with a fluid treatment system which includes a power source. At least one tube is in electrical communication with the power source. A pump adapted to communicate a fluid through the tube. The fluid has a conductive characteristic enabling electrical current to pass through the fluid when passed through the tube. The pump has a first predetermined flow rate. A control box has at least one first device adapted to measure a magnitude of electrical current. At least one second device adapted to vary the magnitude of electrical current. At least one third device adapted to vary said first predetermined flow rate based on the magnitude of electrical current.

In yet another aspect of the present invention, a tube is adapted for use with a fluid treatment system which includes a inner shell having a first bore defined by a curvilinear surface and a longitudinal axis. A plurality of conductors each having a first surface and a connection bore. The plurality of conductors being disposed in the inner shell and being generally in engagement with the first bore. A plurality of insulation members each having a pair of end portions and an intermediate portion and are disposed in the inner shell and generally in engagement with the first bore. The intermediate portion defines a second surface. One of the pair of end portions is in mating engagement with the connection portion of one of the plurality of conductors. Another of the pair of end portions is in mating engagement with the connection portion of another of the plurality of conductors. A channel has a pair of side walls formed by the first surface, the second surface, and a pair of arcuate portions of the first bore. The channel is adapted to pass the fluid through the inner shell.

In yet another aspect of the present invention, a biomass treatment system includes at least one tube having an inlet, an outlet. A first bore is defined by a curvilinear surface and a longitudinal axis. A waste stream is communicated from a waste source to the inlet of at least one tube. A plurality of conductors each has a first surface and a connection bore. The plurality of conductors is disposed in the inner shell and being generally in engagement with the first bore. A plurality of insulation members each have a pair of end portions and an intermediate portion and are disposed in the inner shell and generally in engagement with the first bore. The intermediate portion defines a second surface. One of the pair of end portions is in mating engagement with the connection portion of one of the plurality of conductors. Another of the pair of end portions is in mating engagement with the connection portion of another of the plurality of conductors. A channel has a pair of side walls formed by the first surface, the second surface, and a pair of arcuate portions of the first bore. The channel is adapted to pass the fluid through the inner shell. A power source. A pump adapted to communicate the waste stream over at least a portion of the plurality of conductors. The waste stream has a conductive characteristic which enables electrical communication between a pair of the plurality of conductors. The pump has a first predetermined flow rate. A control box has an amp meter adapted to measure a magnitude of electrical current at the pair of plurality of conductors. At least one phase controller adapted to vary the magnitude of electrical current. At least one pump controller adapted to vary the first predetermined flow rate based on the magnitude of electrical current.

In yet another aspect, a method for treating a biomass waste stream has at least one tube having an inlet and an outlet. A plurality of conductors is disposed in the at least one tube. A power source adapted to provide electrical current to at least one of the plurality of conductors. The method comprises the steps of collecting the waste stream. Passing the waste stream into the inlet of the at least one tube. Providing electrical current from the power source to at least one of the plurality of conductors. Conducting the electrical current from one of the plurality of conductors through the waste stream to another one of the plurality of conductors. Passing the waste stream from the outlet of the at least one tube.

In yet another aspect of the present invention, a method of controlling a biomass waste stream has a pre-determined flow rate. At least one tube has an inlet and an outlet. A plurality of conductors is disposed in the at least one tube. A power source adapted to provide a pre-determined magnitude of electrical current to at least one of the plurality of conductors. A control box adapted to measure a second magnitude of electrical current between at least one pair of the plurality of conductors and provide a third magnitude of electrical current to at least one of the plurality of conductors. The method comprises the steps of collecting the waste stream. Passing the waste stream at a pre-determined flow rate into the inlet of the at least one tube. Measuring the second magnitude of electrical current between at least one pair of the plurality of conductors. Comparing the second magnitude of electrical current with the pre-determined magnitude of electrical current. Providing the third magnitude of electrical current to at least one of the plurality of conductors to generally equalize the second magnitude of electrical current with the pre-determined magnitude of electrical current. Passing the waste stream from the outlet of the at least one tube.

BEST MODE FOR CARRYING OUT THE INVENTION

Figure 1:
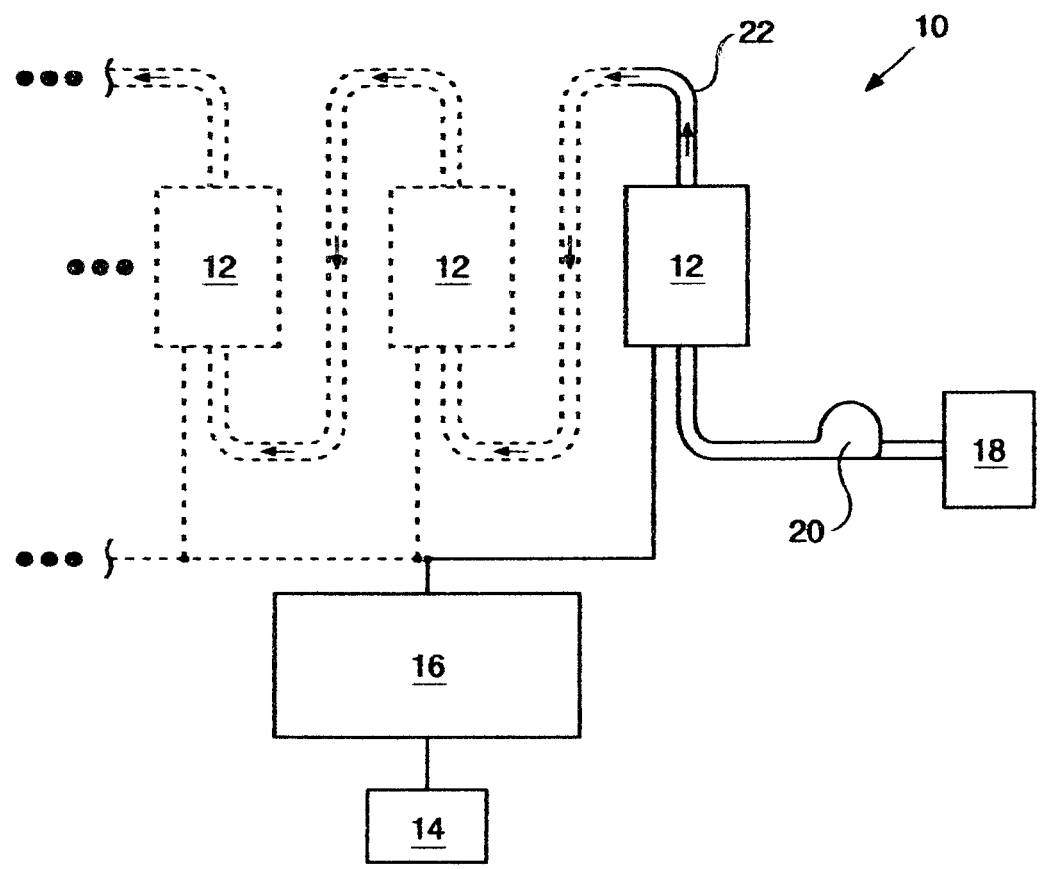
FIG. 1 is a schematic representation of a fluid treatment system embodying the present invention.

Turning to the drawings and particularly to FIG. 1 a schematic representation of a fluid treatment system (10) is shown with one embodiment of the present invention. As seen therein, the fluid treatment system (10) includes at least one tube (12), a power source (14), a control box (16), a fluid source (18), a pump (20), and conduit (22). In the preferred embodiment, the fluid source (18) is a biomass material, typically derived from animals. However, the fluid source (18) may be made by a number of materials, such as, but not limited to, plants, humans, and the like that are well known in the art. Furthermore, the fluid treatment system is shown using one of the at least one tube (12). However, multiple tube (12) may be used without departing from the spirit of the invention. For example, large commercial operations may require several tube assemblies (12) to be used to match the quantity of byproduct desired. Typical installation of multiple tube (12) have tube (12) connected in series. However, fluid treatment systems (10) that are installed in parallel may be used without departing from the spirit of the invention Referring to FIG. 2, the at least one tube (12) includes an outer shell (24) and an inner shell (26). The outer shell (24) defines a shell cavity (28) disposed about and generally surrounds the inner shell (26). The outer shell (24) is typically constructed from a material, such as plastic and the like. However, the outer shell (24) may be constructed from a material, such as, steel, iron, composite, and the like without departing from the spirit of the invention. The shell cavity (28) is typically filled with an insulation material (30), such as foam and the like. Furthermore, the outer shell (24) is attached to the inner shell (26) using a pair of ring members (31). One of the pair of ring members (31) locates the outer shell at the inlet (34) and the other one of the ring members (31) locates the outer shell at the outlet (36). However, the outer shell (24) maybe attached to the tube using adhesive, clamps, and the like that are well known in the art.

Figure 2:
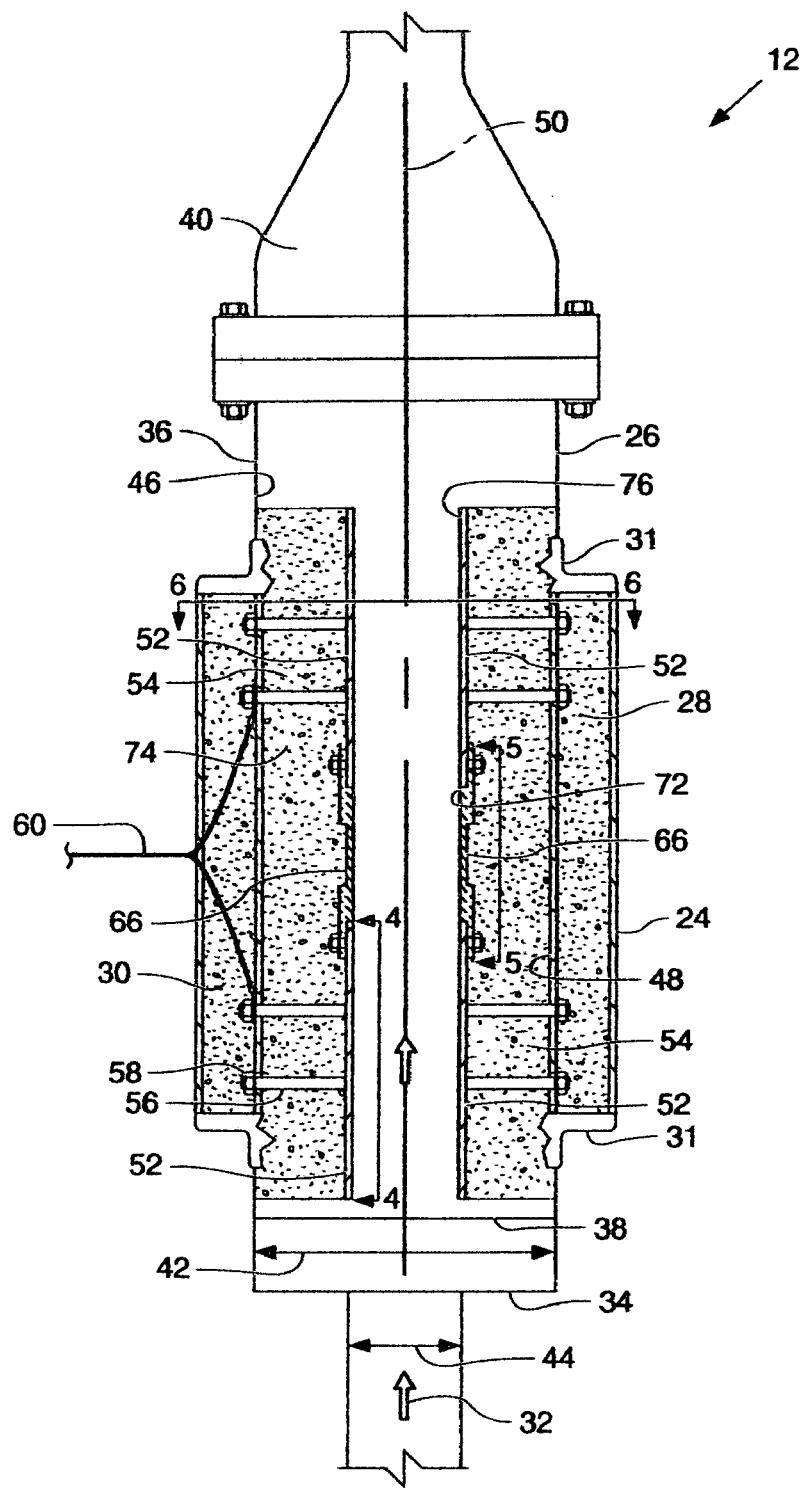
FIG. 2 is a diagrammatic partial cross-sectional view of at least one tube of FIG. 1 embodying the present invention.

The inner shell (26) as shown in FIG. 2 has an inlet (34) and outlet (36) for passing fluid (32) from the conduit (22). The inlet (34) is connected to the conduit (22) using a reducing plate (38). The reducing plate (38) allows fluid (32) from the conduit (22) to pass into the inlet (34) of the inner shell (26). The fluid (32) entering the inlet (34) has a first magnitude of odor. The outlet (36) of the inner shell (26) is fastened to a reducer (40). The reducer (40) allows fluid (32) to pass from the outlet (36) of inner shell (26) into the conduit (22). The fluid (32) exiting the outlet (36) has a second magnitude of odor. The second magnitude of odor is generally less in magnitude than the first magnitude of odor. It should be recognized that the fluid (32) may be identified by other relevant factors, such as, bacteria, fecal coliform, biological oxygen demand, nitrates, phosphates, and sulfide alone or in combination without departing from the spirit of the invention. For example, the fluid (32) has a first magnitude of bacteria entering the inlet (34) and a second magnitude of bacteria exiting the outlet (36). The second magnitude of bacteria is generally less in magnitude than the first magnitude of bacteria. Another example, the fluid (32) has a first magnitude of fecal coliform entering the inlet (34) and a second magnitude of fecal coliform exiting the outlet (36). The second magnitude of fecal coliform is generally less in magnitude than the first magnitude of fecal coliform. Another example, the fluid (32) has a first magnitude of biological oxygen demand entering the inlet (34) and a second magnitude of biological oxygen demand exiting the outlet (36). The second magnitude of biological oxygen demand is generally less in magnitude than the first magnitude of biological oxygen demand. Another example, the fluid (32) has a first magnitude of nitrates entering the inlet (34) and a second magnitude of nitrates exiting the outlet (36). The second magnitude of nitrates is generally less in magnitude than the first magnitude of nitrates. Another example, the fluid (32) has a first magnitude of phosphates entering the inlet (34) and a second magnitude of phosphates exiting the outlet (36). The second magnitude of phosphates is generally less in magnitude than the first magnitude of phosphates. Another example, the fluid (32) has a first magnitude of sulfide entering the inlet (34) and a second magnitude of sulfide exiting the outlet (36). The second magnitude of sulfide is generally less in magnitude than the first magnitude of sulfide. It should be recognized that the relevant factors identifying the fluid (32) may be used in combination without departing from the spirit of the invention. For example, the fluid (32) has a first magnitude of factors characteristic of a combination of first magnitudes discussed above entering the inlet (34) and a second magnitude of factors exiting the outlet (36). The second magnitude of factors is generally less in magnitude than the first magnitude of factors. The reducing plate (38) and reducer (40) are sized to match a tube diameter (42) with a conduit diameter (44). Typically, the conduit diameter (44) is less in magnitude than the tube diameter (42). It should be realized that other configuration may be used without departing from the spirit of the invention. For example, the conduit diameter (44) may be equal or larger in magnitude to the tube diameter (42). The material of the reducing plate (38) and reducer (40) may be constructed of plastic, iron, steel, composite, as well as, other materials known in the art. The inner shell (26) has a first bore (46) defined by a curvilinear surface (48) and a longitudinal axis (50). The curvilinear surface (48) is typically disposed about and generally parallel to the longitudinal axis (50). However, other bore configurations may be used without departing from the spirit of the invention. For example, square surfaces, triangular surfaces, and other geometric surfaces well known in the art.

Figure 4:
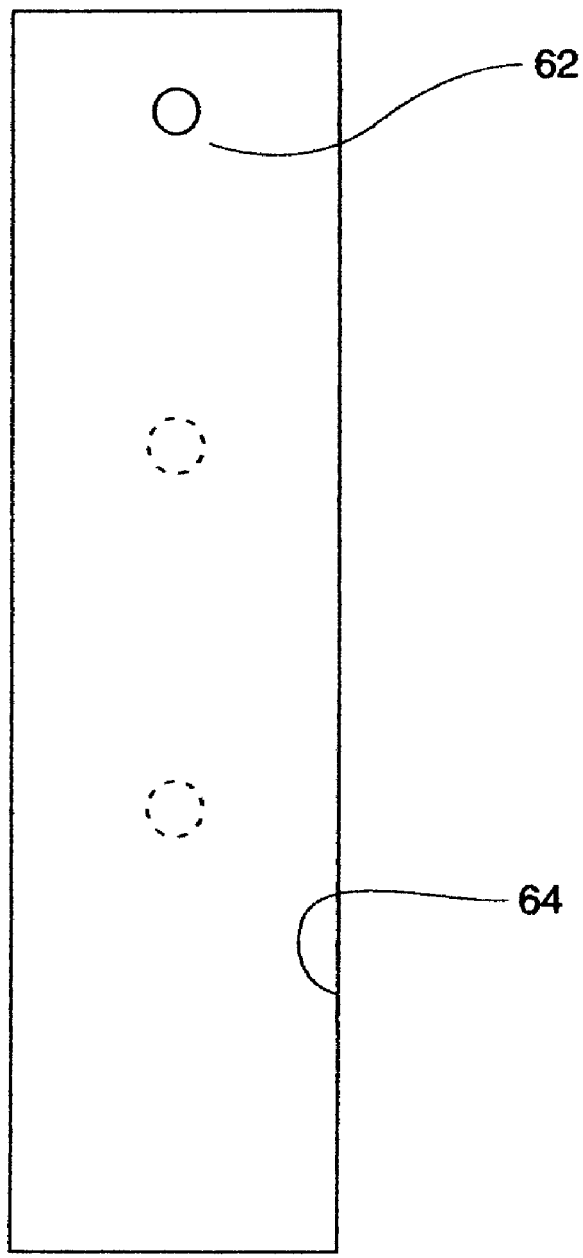
FIG. 4 is a diagrammatic partial cross-sectional view taken along lines 4-4 of FIG. 2 embodying the present invention.

Referring to FIG. 2 and FIG. 4, a plurality of conductors (52) is disposed in the inner shell (26) and in engagement with the first bore (46). A conductor cavity (54) is defined between the curvilinear surface (48) and the plurality of conductors (52). Furthermore, each of the plurality of conductors (52) is fastened to the inner shell (26) using at least one stud (56) attached to the plurality of conductors (52). The type of connection between the at least one stud (56) and the plurality of conductors (52) is well known to somebody skilled in the art. For example, the connection could be achieved by using a weld, adhesive, and the like without departing from the spirit of the invention. At least one stud (56) extends through the inner shell (26) and into the shell cavity (28) of the outer shell (24). A lock nut (58) is threaded onto at least one stud (56) providing a releasable connection between the plurality of conductors (52) and the inner shell (26). The plurality of conductors (52) are made form a steel, stainless steel, copper, cast iron, and the like without departing from the spirit of the invention. To improve wear characteristics of the plurality of conductors (52), a coating of chrome, polymer, ceramic, and the like may be applied without departing from the spirit of the invention. Another embodiment (not shown), may have support members formed with the at least one tube (12). The support members provide the structure for attaching the plurality of conductors (12) to the tube (12). The attachment of the plurality of conductors (12) is typically the same as discussed above. A wire (60) from a control box (16) is in engagement with the at least one stud (56) passing current from the control box (16) to the plurality of conductors (52). The control box (16) will be discussed in greater detail below. The plurality of conductors (52) each has a connection portion (62) and a first surface (64) which will be discussed in more detail below.

Figure 5:
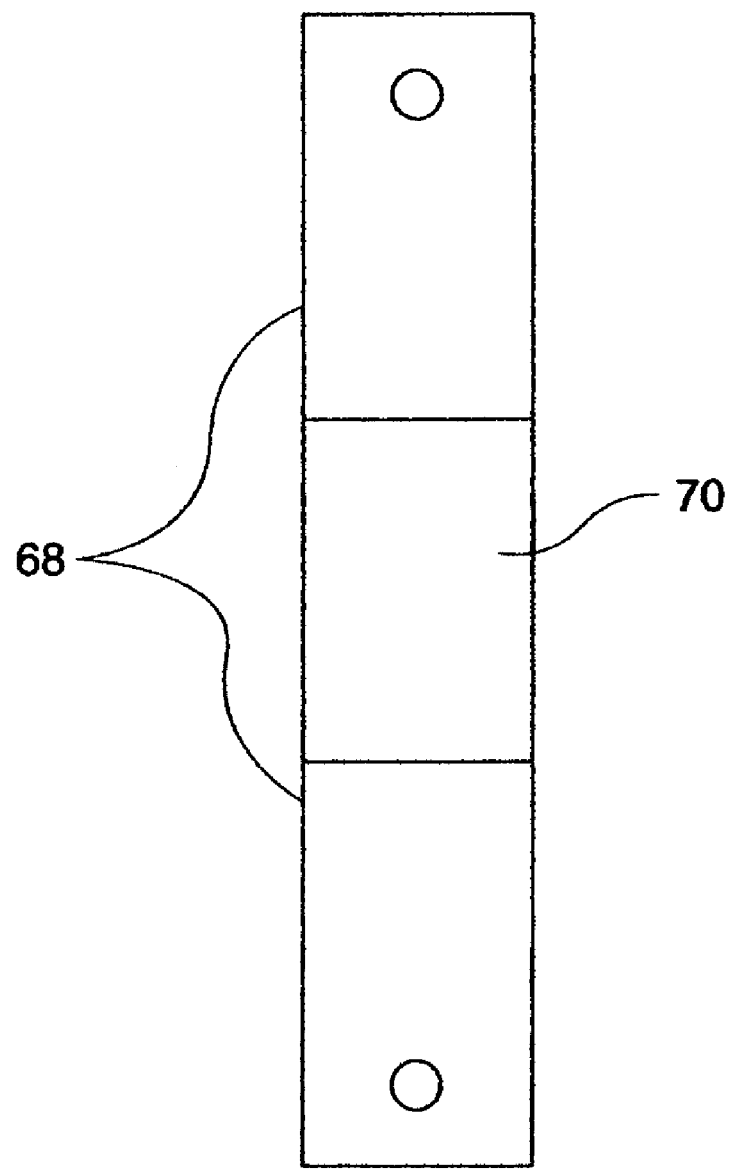
FIG. 5 is a diagrammatic partial cross-sectional view taken along lines 5-5 of FIG. 2 embodying the present invention.

Referring to FIG. 2 and FIG. 5, a plurality of insulation members (66) is disposed in the inner shell (26) and in engagement with the first bore (46). Each of the plurality of insulation members (66) has a pair of end portions (68) and an intermediate portion (70). The intermediate portion defines a second surface (72). One of the pair of end portions (68) is in mating contact with the connection portion (62) of one of the plurality of conductors (52) and the other one of the pair of end portions (68) is in mating contact with the connection portion (62) of another one of the plurality of conductors (52). The engagement between the pair of end portions (68) and the connection portion (62) generally aligns the first surface (64) of the plurality of conductors (52) with the second surface (72) of the plurality of insulation members (66). The type of connection between each of the pair of end portions (68) and the connection portion (62) of the plurality of conductors (52) is well known in the art. For example, the connection could be achieved by using a bolt, stud, rivet and the like without departing from the spirit of the invention. The plurality of insulation members are made of plastic material and the like without departing from the spirit of the invention. An insulator cavity (74) is defined between the curvilinear surface (48) and the plurality of insulation members (66). Typical applications fill the conductor cavity (54) and insulator cavity (74) with insulation, such as foam. Insulating the outer shell (24) and the conductor and insulator cavities (54, 74) minimizes the amount of condensation that occurs during operation of the fluid treatment system (10). It should be recognized, as discussed with the plurality of conductors (52, that another embodiment may have support structure formed with at least one plurality of tubes (12) without departing from the spirit of the invention. Furthermore, non-conductive materials may be used to form the support structure, such as polymers, which may allow the plurality of insulation members (66) to be integral with the at least one tube (12).

Figure 6:
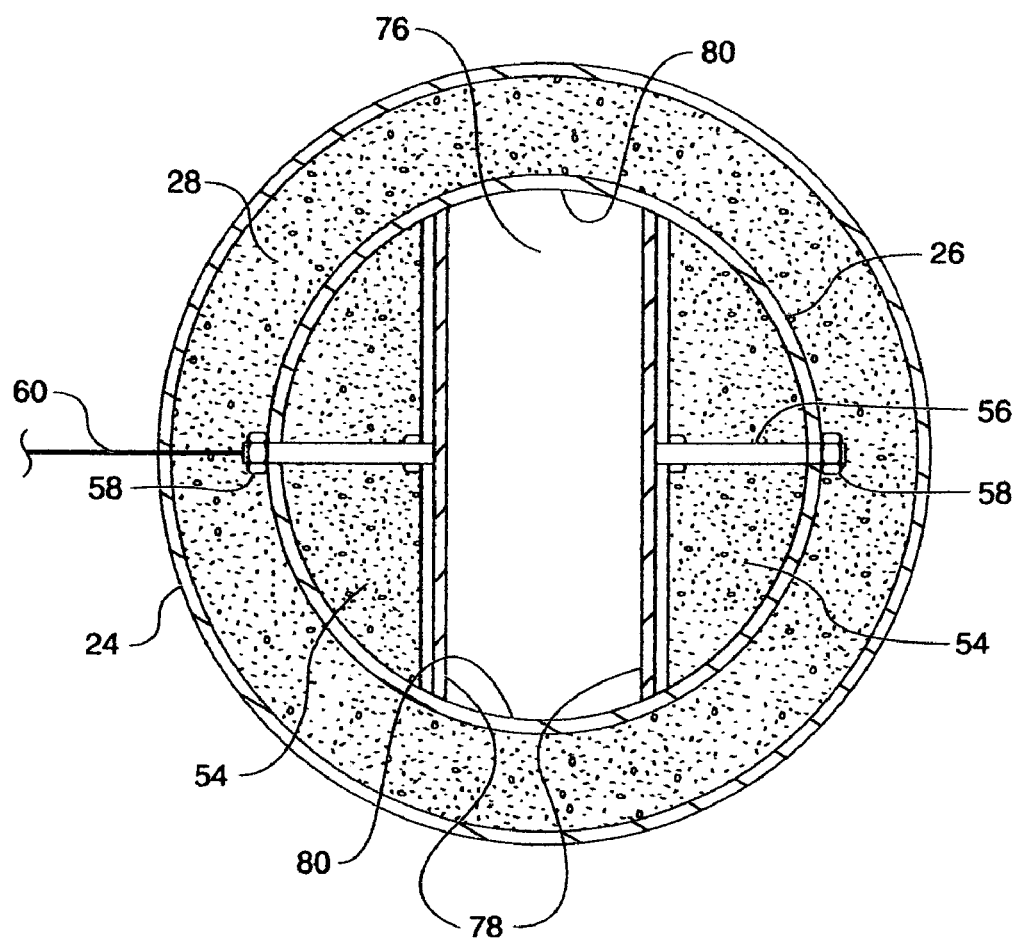
FIG. 6 is a diagrammatic partial cross-sectional view taken along lines 6-6 of FIG. 2 embodying the present invention.

The inner shell (26), as shown in FIG. 2 and FIG. 6, has a channel (76) formed therein. The channel (76) is constructed of a pair of side walls (78) formed from the first surface (64) of the plurality of conductors (52) and the second surface (72) of the plurality of insulation members (66), and a pair of arcuate portions (80) of the first bore (46). The channel (76) passes fluid (32) from the inlet (34) to the outlet (36) of the inner shell (26). The flow of fluid (32) through the channel passes over at least a portion of the plurality of conductors and insulation members (52, 66).

Referring to FIG. 1, the pump (20) provides communication from the fluid source (18) to at least one of the tube (12). The pump (20) is in electrical communication with the power source (14). The pump (20) passes the fluid through the conduit (22) at a first predetermined flow rate. It should be recognized that other pump (20) configurations may be used without departing from the spirit of the invention. For example, larger applications may require multiple pumps (20) to be disposed in the conduit (22) for providing the desired flow rate.

Figure 3:
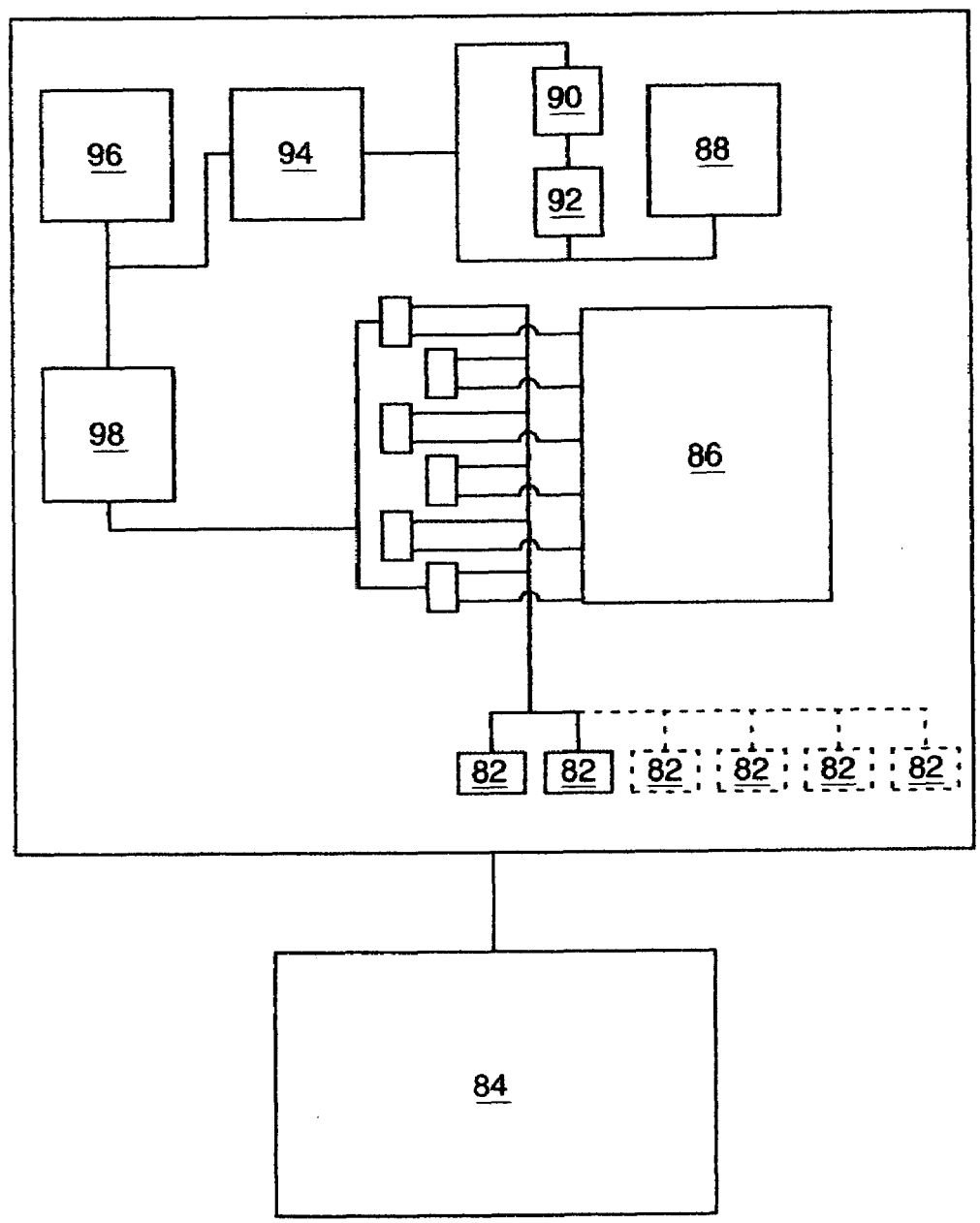
FIG. 3 is a diagrammatic partial cross-sectional view of a control box of FIG. 1 embodying the present invention.

Referring to FIG. 1 and FIG. 3, the control box (16) provides control of the pump (20) and electrical current to the plurality of conductors (52). A first device (82) is disposed in the control box (16) and provides feedback control from the fluid treatment system (10). Typically, an amp meter (82) is used to measure a second magnitude of electrical current that is being used in the fluid treatment system (10). It should be recognized that other devices may be used without departing from the spirit of the invention. For example, multi-meters, photo electrics, fiber optics, flow meters, and the like that are well know in the art may be used. A power source (84) typically provides a pre-determined electrical current generally between 20 volts and 1,000 volts to the plurality of conductors (52). The control box (16) compares the pre-determined electrical current being communicated to the plurality of conductors (52) with the second magnitude of electrical current measured with the first device (82). When a variation between the pre-determined electrical current communicated and the second measured electrical current is outside a predetermined tolerance then the control box (16) uses a second device (86) to minimize the variation in electrical current. A third magnitude of electrical current is communicated to the plurality of conductors (52). The third magnitude of electrical current is such that, the second magnitude of electrical current is generally equal to the pre-determined electrical current. The second magnitude of electrical current is characteristic of the fluid (32) being used. For example, a fluid (32) that includes animal excrement, such as a waste stream, has a predetermined conductive characteristic which typically differs from waste streams characteristic of plant waste or human waste. Furthermore, corrosion of the plurality of conductors (52) occurs at different rates based on the characteristics of the fluid (32) being used. Typically, a phase controller (86) is used to vary the third magnitude of electrical current that is communicated between the power source (82) and the plurality of conductors (52). The preferred second device (86) is a silicon controlled rectifier (86). The silicon controlled rectifier (86) is a solid state switching device which provides a fast and infinitely variable proportional control of electrical current. The silicon controlled rectifier (86) has phase angle fired controls to turn on a percentage of each wire (60) half cycle to give a smooth variable application of power, to adjust to fast load changes, to include voltage limits, soft start, and current limit. It should be recognized that other types of second device (86) may be used without departing from the spirit of the invention. For example, solid state rectifiers and the like that are well known in the art. In some instances, the fluid treatment system may reach operational limits which may require the control box (16) to use a third device (88) to minimize the variation between the electrical current communicated to the plurality of conductors and the magnitude of electrical current measured by the first device (82). The third device, such as, a pump controller (88) varies the flow rate provided by the pump to compensate for the variation discussed above. The third device (88) provides a flow rate generally between 25 gallons per minute and 40 gallons per minute. The ability of controlling the electrical current and flow rate of the fluid (34) provides consistent operation of the fluid treatment system (10). Furthermore, the control box (16) is at least partially air-conditioned to provide long life for components, such as, the first, second, and third devices (82, 86, 88) that are disposed in the control box (16). However, it should be recognized that, the control box (16) without air-conditioning would not depart from the spirit of the invention. Control box (16) components, such as, a fuse block (90), a starter (92), a transformer (94), a breaker (96), a contactor (98), and the like may be used with the fluid treatment system (10) without departing from the spirit of the invention.

INDUSTRIAL APPLICABILITY

With reference to the Figs. and in operation, reduction of odor, bacteria, biological oxygen demand, and other concentrations of constituents, i.e. fecal coliform, nitrates, phosphates, sulfides, and the like are reduced by using the fluid treatment system (10). Fluid (32) is passed through the conduit (22) to one of the at least one tube (12). The fluid (32) is pumped from the fluid source (18), such as animal excrement from a hog farm to the at least one tube (12). The fluid (32) passes through the tube where an electrical current is communicated to the plurality of conductors (52). The fluid (32) passing through the at least one tube (32) conducts the electrical current from one of the plurality of conductors (52) to another of the plurality of conductors (52). It is this electrical current being conducted through the fluid (32) that reduces the concentration of constituents. In applications that include multiple tube assemblies (12), the fluid is then passed through conduit to the next at least one tube (12). The operation of conducting the electrical current through the liquid typically increases the temperature of the fluid (32). The conduit between tube assemblies (12) allows the fluid to decrease in temperature. Thus, allowing the fluid to cool between tube assemblies (12) which improve the overall operation, and life of the plurality of conductors (52) in the fluid treatment system (10). The control box (16) provides uniformity and consistency between the plurality of electrodes (52). The control box (16) the first device (82) measures the magnitude of electric current utilized during operation. The control box (16) compares the magnitude of electrical current with what was communicated from the power source (14) to the plurality of conductors (52). The control box (16) utilizes the second device (86) to vary the magnitude of electrical current communicated to the plurality of conductors (52). The ability to vary the magnitude of electrical current that is conducted through the fluid (32) enhances the operation of the fluid treatment system (10). Further enhancing the fluid treatment system (10), the control box (16), utilizes the third device (88) to control the flow rate of the fluid (32) passing through the inner shell (26). The capability of controlling the pump (20), i.e. flow rate, allows the fluid (32) to pass over at least a portion of the plurality of conductors (52) at a rate that corresponds to the fluid (32) level of conductivity.

A method of treating the biomass waste stream, i.e. animal excrement and the like. Collect the waste stream (32) and pass the waste stream (32) into the inlet (34) of at least one tube (12). Provide electrical current from the power source (14) to at least one of said plurality of conductors (52). Conduct electrical current from one of the plurality of conductors (52) through the waste stream (32) to another of said plurality of conductors (52). Pass the waste stream from the outlet of at least one tube (12).

A method of controlling the biomass waste stream (32), i.e. animal excrement and the like. Collect the waste stream (32). Pass the waste stream (32) at the pre-determined flow rate into the inlet (34) of the at least one tube (12). Measure the second magnitude of electrical current between at least one pair of the plurality of conductors (52). Compare the second magnitude of electrical current with the pre-determined magnitude of electrical current. Provide the third magnitude of electrical current to at least one of the plurality of conductors (52) to generally equalize the second magnitude of electrical current with the pre-determined magnitude of electrical current. Pass the waste stream from the outlet of the at least one tube (12).

Fluid treatment systems (10) that utilize the at least one tube (12) have improved operation. The plurality of conductors (52) as discussed above provides a longer life with less service time. The ability for owners to utilize the quantity of tube assemblies (12) desired allows for efficient and economical operation of the fluid treatment system (10). The degree of control in electrical communication and flow rate provide a uniform and consistent operation which reduces wear of the plurality of conductors (52). Furthermore, fluid treatment systems (10), as discussed above allows for less complex orientations of the plurality of conductors (52) within the inner shell (26) which enhances operation, durability, and maintenance.

Other aspects, objects and advantages of this invention can be obtained from a study of the drawings, the disclosure and the appended claims.

What is claimed is:

1. At least one tube, being adapted for use with a fluid treatment system, comprising:
    an inner shell having a first bore defined by a curvilinear surface and a longitudinal axis;
    a plurality of conductors each having a first surface and a connection bore, and said plurality of conductors being disposed in said inner shell and being generally in engagement with said first bore;
    a plurality of insulation members each having a pair of end portions and an intermediate portion and being disposed in said inner shell and generally in engagement with said first bore, said intermediate portion defines a second surface, one of said pair of end portions being in mating engagement with said connection portion of one of said plurality of conductors, and another of said pair of end portions being in mating engagement with said connection portion of another of said plurality of conductors; and
    a channel having a pair of side walls being formed by said first surface, said second surface, and a pair of arcuate portions of said first bore, said channel adapted to pass said fluid through said inner shell.

2. At least one tube, as set forth in claim 1, wherein said plurality of conductors being releasably attached to said inner shell.

3. At least one tube, as set forth in claim 2, wherein said inner shell having a conductor cavity defined between said curvilinear surface and said plurality of conductors, an insulator cavity defined between said curvilinear surface and said plurality of insulation members, and said conductor cavity and said insulator cavity being generally filled with insulation.

4. At least one tube, as set forth in claim 1, wherein said inner shell having an outer shell disposed about and generally surrounding said inner shell.

5. At least one tube, as set forth in claim 4, wherein said outer shell having insulation between said outer shell and said inner shell.

6. At least one tube, as set forth in claim 1, wherein said inner shell defines an inlet and said inlet connected to a reducing plate.

7. At least one tube, as set forth in claim 1, wherein said plurality of conductors being made of a steel material.

8. At least one tube, as set forth in claim 1, wherein said plurality conductors being coated with a chrome material.

9. At least one tube, as set forth in claim 1, wherein said plurality of conductors being coated with a polymer material.

10. At least one tube, as set forth in claim 1, wherein said plurality of conductors being coated with a ceramic material.

11. At least one tube, as set forth in claim 1, wherein said plurality of conductors being made of a stainless steel material.

12. At least one tube, as set forth in claim 1, wherein said plurality of conductors being made of a copper material.

13. At least one tube, as set forth in claim 1, wherein said plurality of insulation members being made of a plastic material.

14. At least one tube, as set forth in claim 1, wherein said plurality of insulation members being releasably attached to said plurality of conductors.

* * * * *